United States Patent
Komatsu et al.

(10) Patent No.: US 10,256,988 B2
(45) Date of Patent: Apr. 9, 2019

(54) COMMUNICATION SYSTEM, COMMUNICATION DEVICE, COMMUNICATION ADAPTER, COMMUNICATION METHOD, AND PROGRAM

(71) Applicant: Mitsubishi Electric Corporation, Tokyo (JP)

(72) Inventors: Masayuki Komatsu, Tokyo (JP); Hirotoshi Yano, Tokyo (JP); Masaaki Yabe, Tokyo (JP); Satoshi Minezawa, Tokyo (JP); Ichiro Maruyama, Tokyo (JP); Shinji Nakamura, Tokyo (JP); Shiro Suzuki, Tokyo (JP); Yuki Ogawa, Tokyo (JP); Kaori Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 199 days.

(21) Appl. No.: 14/904,969

(22) PCT Filed: Jul. 4, 2014

(86) PCT No.: PCT/JP2014/067942
§ 371 (c)(1),
(2) Date: Jan. 14, 2016

(87) PCT Pub. No.: WO2015/008641
PCT Pub. Date: Jan. 22, 2015

(65) Prior Publication Data
US 2016/0156483 A1     Jun. 2, 2016

(30) Foreign Application Priority Data

Jul. 17, 2013 (JP) .................................. 2013-148469

(51) Int. Cl.
H04L 12/28 (2006.01)
G06F 13/00 (2006.01)
H04L 29/06 (2006.01)

(52) U.S. Cl.
CPC .......... *H04L 12/2818* (2013.01); *G06F 13/00* (2013.01); *H04L 12/28* (2013.01);
(Continued)

(58) Field of Classification Search
CPC ...................................... H04L 69/18
(Continued)

(56) References Cited

U.S. PATENT DOCUMENTS 7,804,038 B2    9/2010  Bortolus et al.
2002/0159481 A1* 10/2002 Takatori ............. H04L 63/0457
                                                          370/474
(Continued)

FOREIGN PATENT DOCUMENTS

EP    0 621 522 A2   10/1994
EP    2530912 A2    12/2012
(Continued)

OTHER PUBLICATIONS

International Search Report of the International Searching Authority dated Jul. 29, 2014 for the corresponding international application No. PCT/JP2014/067942 (and English translation).
(Continued)

*Primary Examiner* — Vivek Srivastava
*Assistant Examiner* — Sibte H Bukhari
(74) *Attorney, Agent, or Firm* — Posz Law Group, PLC

(57) ABSTRACT

A standardized information acquirer acquires standardized information from an electric device. A standardized telegraphic message sender sends a standardized telegraphic message including the standardized information to a communication device. An unstandardized information acquirer
(Continued)

acquires unstandardized information from the electric device. A standardized telegraphic message receiver receives the standardized telegraphic message including the standardized information. An electric device determiner determines whether the electric device meets a specific condition based on the standardized information included in the received standardized telegraphic message. When the electric device is determined to meet the specific condition, an unstandardized telegraphic message sender sends the unstandardized telegraphic message including the unstandardized information. An unstandardized telegraphic message receiver receives the unstandardized telegraphic message including the unstandardized information.

9 Claims, 12 Drawing Sheets

(52) U.S. Cl.
CPC ...... *H04L 12/2832* (2013.01); *H04L 12/2834* (2013.01); *H04L 69/18* (2013.01)

(58) Field of Classification Search
USPC ........................................ 709/204
See application file for complete search history.

(56) References Cited

U.S. PATENT DOCUMENTS

| | | |
|---|---|---|
| 2003/0018753 A1 | 1/2003 | Seki |
| 2003/0065824 A1 | 4/2003 | Kudo |
| 2008/0104687 A1 | 5/2008 | Fujiwara et al. |
| 2009/0265583 A1* | 10/2009 | Bouse ............... G05B 19/0425 714/37 |
| 2012/0084342 A1 | 4/2012 | Brown et al. |
| 2012/0311181 A1 | 12/2012 | Smith et al. |

FOREIGN PATENT DOCUMENTS

| | | |
|---|---|---|
| EP | 2592781 A1 | 5/2013 |
| JP | 2003-030072 A | 1/2003 |
| JP | 2003-087293 A | 3/2003 |
| JP | 2004-180260 A | 6/2004 |
| JP | 2004-310295 A | 11/2004 |
| JP | 2004-349775 A | 12/2004 |
| JP | 2009-237833 A | 10/2009 |
| WO | 2006/057280 A1 | 6/2006 |

OTHER PUBLICATIONS

Office Action dated Jul. 22, 2014 issued in corresponding JP patent application No. 2013-148469 (and partial English translation).
Extended European Search Report dated Dec. 19, 2016 issued in corresponding EP patent application No. 14826460.9.
Office Action dated Feb. 2, 2018 issued in corresponding CN patent application No. 201480040231.3 (and English translation thereof).
Office Action dated Mar. 16, 2018 issued in corresponding EP patent application No. 14826460.9.

* cited by examiner

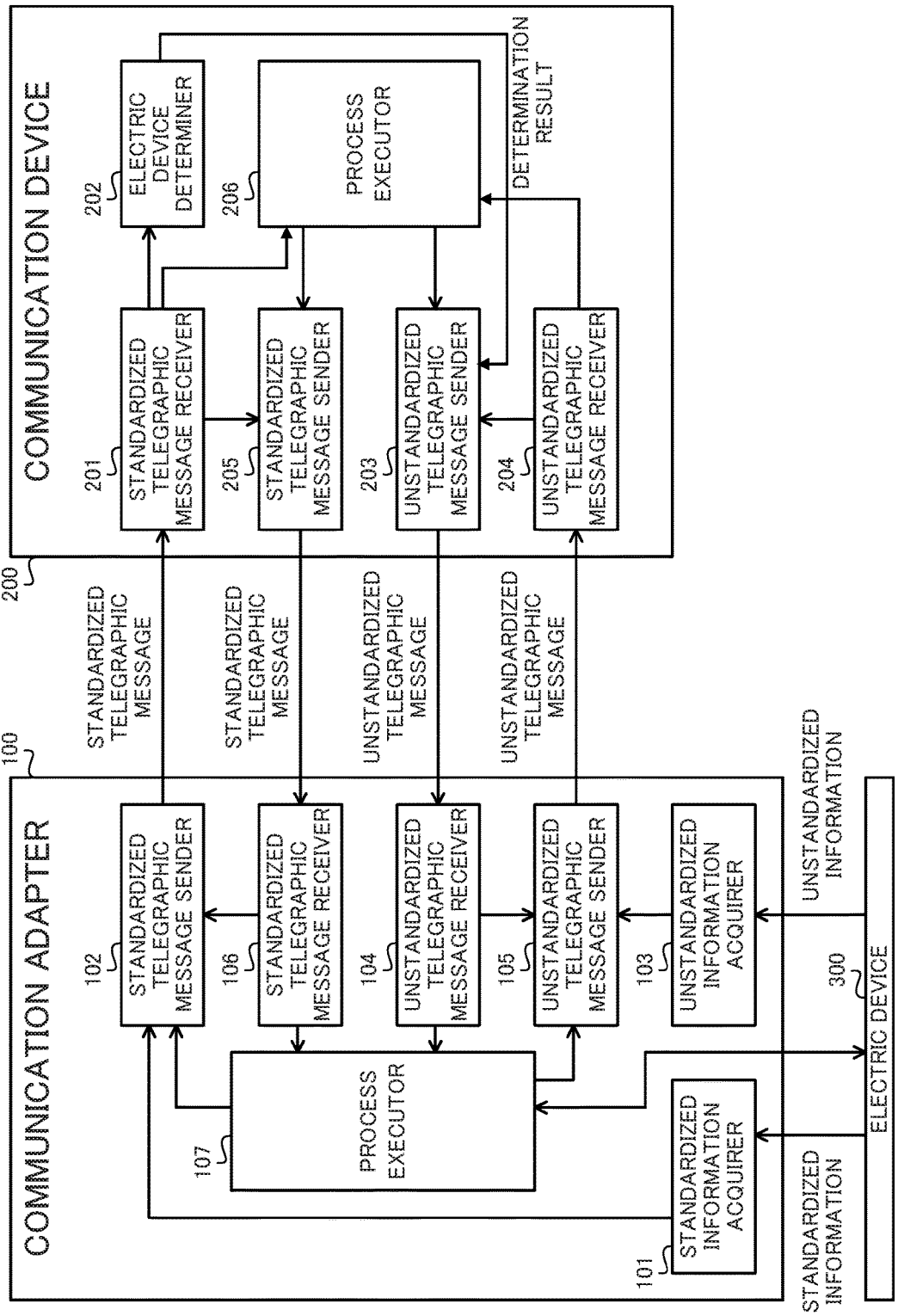

FIG. 6A

STANDARDIZED INFORMATION

| STANDARDIZED DEVICE INFORMATION |
|---|
| STANDARDIZED FUNCTION INFORMATION |
| STANDARDIZED-DEVICE-INFORMATION ACQUISITION TELEGRAPHIC MESSAGE INFORMATION |
| STANDARDIZED-FUNCTION UTILIZATION TELEGRAPHIC MESSAGE INFORMATION |

FIG. 6B

UNSTANDARDIZED INFORMATION

| UNSTANDARDIZED DEVICE INFORMATION |
|---|
| UNSTANDARDIZED FUNCTION INFORMATION |
| UNSTANDARDIZED-DEVICE-INFORMATION ACQUISITION TELEGRAPHIC MESSAGE INFORMATION |
| UNSTANDARDIZED-FUNCTION UTILIZATION TELEGRAPHIC MESSAGE INFORMATION |

FIG. 7A

STANDARDIZED TELEGRAPHIC MESSAGE

| TELEGRAPHIC MESSAGE FORMAT | TELEGRAPHIC MESSAGE CODE | TRANSMISSION-DESTINATION ADDRESS | TRANSMISSION-ORIGINATOR ADDRESS | TELEGRAPHIC MESSAGE DETAIL |
|---|---|---|---|---|
| STANDARDIZED TELEGRAPHIC MESSAGE | AAA | COMMUNICATION DEVICE 200 | ELECTRIC DEVICE 300 | IN COOLING |

FIG. 7B

UNSTANDARDIZED TELEGRAPHIC MESSAGE

| TELEGRAPHIC MESSAGE FORMAT | TELEGRAPHIC MESSAGE CODE | TRANSMISSION-DESTINATION ADDRESS | TRANSMISSION-ORIGINATOR ADDRESS | TELEGRAPHIC MESSAGE DETAIL |
|---|---|---|---|---|
| UNSTANDARDIZED TELEGRAPHIC MESSAGE | BBB | ELECTRIC DEVICE 300 | COMMUNICATION DEVICE 200 | REQUEST FOR LIST OF UNSTANDARDIZED FUNCTIONS | ated Japanese Patent Application No. 2013-148469 filed on Jul. 17, 2013, the contents of which are incorporated herein by reference.

COMMUNICATION SYSTEM, COMMUNICATION DEVICE, COMMUNICATION ADAPTER, COMMUNICATION METHOD, AND PROGRAM

CROSS REFERENCE TO RELATED APPLICATION

This application is a U.S. national stage application of International Patent Application No. PCT/JP2014/067942 filed on Jul. 4, 2014, which claims priority to Japanese Patent Application No. 2013-148469 filed on Jul. 17, 2013, the contents of which are incorporated herein by reference.

TECHNICAL FIELD

The present disclosure relates to a communication system, a communication device, a communication adapter, a communication method, and a program.

BACKGROUND

Presently, a communication system that includes a communication adapter enabling an electric device to communicate, and a communication device communicating with the communication adapter is known. According to such a communication system, the communication device is enabled to communicate with an electric device that has no communication function. According to such a communication system, for example, the communication device is able to acquire, from the electric device, information for utilizing a function of the electric device, and to execute a process that utilizes the function of the electric device based on the acquired information.

For example, the communication device creates a user interface for operating the electric device based on the information acquired from the electric device, and presents the created user interface to a user. In addition, for example, the communication device creates a telegraphic message for controlling the electric device based on the information acquired therefrom, and sends the message to the electric device. Such a communication system is disclosed in, for example, Patent Literature 1.

Such a communication system is often constructed of not only the electric device and the communication device manufactured by the same manufacturer, but also the electric device and the communication device manufactured by various manufacturers. Hence, in such a communication system, the function of the electric device is often a function which is standardized and which does not depend on a particular manufacturer that has manufactured the electric device. In this case, basically, information held by the electric device is information which is standardized and which does not depend on the particular manufacturer that has manufactured the electric device, and a standardized telegraphic message is utilized as a telegraphic message for transmitting the standardized information.

PATENT LITERATURE

Patent Literature 1: Unexamined Japanese Patent Application Kokai Publication No. 2009-237833.

In this case, due to a reason that, for example, some manufacturers want to allow their electric devices to have an unstandardized function, there is a desire to allow the electric device to hold not only standardized information but also unstandardized information. On the other hand, when the electric device holds unstandardized information, in view of a prevention of an information leak and an erroneous operation, and the like, a suppression of transfer of unstandardized information to the communication device is sometimes desired. Hence, there is a desire for a technique that enables the communication device to appropriately acquire unstandardized information held by an electric device.

SUMMARY

Therefore, the present disclosure has been made in view of the aforementioned circumstances, and it is an objective of the present disclosure to provide a communication system, a communication device, a communication adapter, a communication method, and a program that enables a communication device to appropriately acquire unstandardized information held by an electric device.

In order to accomplish the above objective, a communication system according to the present disclosure includes:
  a communication adapter provided for communication of an electric device; and
  a communication device configured to communicate with the communication adapter, in which
  the communication adapter includes:
    standardized information acquiring means for acquiring standardized information from the electric device, wherein the standardized information represents information that is standardized;
    standardized telegraphic message sending means for sending a standardized telegraphic message including the standardized information acquired by the standardized information acquiring means to the communication device, wherein the standardized telegraphic message represents a telegraphic message that is standardized;
    unstandardized information acquiring means for acquiring unstandardized information from the electric device, wherein the unstandardized information represents information that is not standardized;
    unstandardized telegraphic message receiving means for receiving an unstandardized telegraphic message including request information of the unstandardized information from the communication device, wherein the unstandardized telegraphic message represents a telegraphic message that is not standardized; and
    unstandardized telegraphic message sending means for sending an unstandardized telegraphic message including the unstandardized information acquired by the unstandardized information acquiring means to the communication device when the unstandardized telegraphic message receiving means receives the unstandardized telegraphic message that includes the request information, and
  the communication device includes:
    standardized telegraphic message receiving means for receiving the standardized telegraphic message sent by the standardized telegraphic message sending means;
    electric device determining means for determining whether the electric device meets a specific condition based on the standardized information included in the standardized telegraphic message received by the standardized telegraphic message receiving means;
    unstandardized telegraphic message sending means for sending the unstandardized telegraphic message including the request information to the communication adapter when the electric device is determined to meet the specific condition by the electric device determining means; and unstandardized telegraphic message receiving means for receiving the unstandardized telegraphic message including the unstandardized information sent by the unstandardized telegraphic message sending means included in the communication adapter.

According to the present disclosure, whether or not to allow the communication device to acquire unstandardized information held by the electric device is appropriately determined based on standardized information held by the electric device. Therefore, according to the present disclosure, the communication device is enabled to appropriately acquire the unstandardized information held by the electric device.

BRIEF DESCRIPTION OF DRAWINGS

FIG. 5 is a diagram for explaining a function of the communication adapter and that of the communication device according to the first embodiment of the present disclosure;

FIG. 6A is a diagram illustrating standardized information;

FIG. 6B is a diagram illustrating unstandardized information;

FIG. 7A is a diagram illustrating a standardized telegraphic message;

FIG. 7B is a diagram illustrating a unstandardized telegraphic message;

DETAILED DESCRIPTION

Embodiments of the present disclosure will be explained with reference to the figures.

First Embodiment

First of all, a communication system 1000 according to a first embodiment of the present disclosure will be explained.

Figure 1:
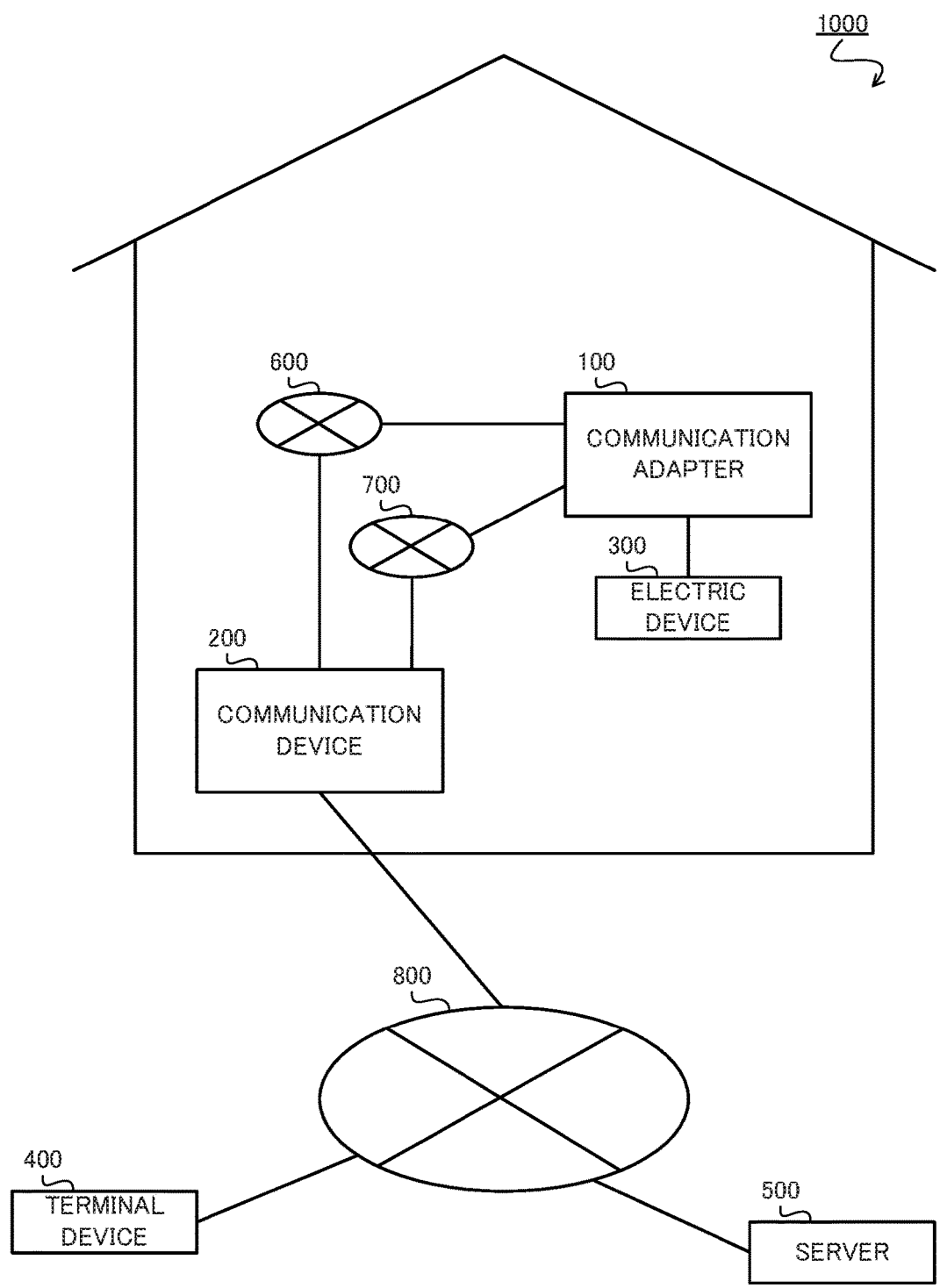
FIG. 1 is a system diagram of a communication system according to a first embodiment of the present disclosure.

The communication system 1000 is a system that enables a communication device 200 and an electric device 300 to communicate with each other. Typically, the communication system 1000 is a system for controlling the electric device 300 from a terminal device 400 and/or the communication device 200. As illustrated in FIG. 1, the communication system 1000 includes a communication adapter 100, the communication device 200, the electric device 300, the terminal device 400, and a server 500. In this case, the communication adapter 100 and the communication device 200 are connected with each other via each of a first internal electric communication network 600 and a second internal electric communication network 700. In addition, the communication device 200, the terminal device 400, and the server 500 are connected to one another via an external electric communication network 800.

The communication adapter 100 is an interface that connects the electric device 300 to the first internal electric communication network 600 and the second internal electric communication network 700 with which the communication device 200 is connected. Hence, the communication adapter 100 has a function to be connected with the first internal electric communication network 600, and is capable of exchanging information with the communication device 200 via the first internal electric communication network 600. In addition, the communication adapter 100 has a function to be connected with the second internal electric communication network 700, and is capable of exchanging information with the communication device 200 via the second internal electric communication network 700. Still further, the communication adapter 100 is capable of exchanging information with the electric device 300. The communication adapter 100 has a computer that includes, for example, an Integrated Circuit (IC) for communication.

The communication device 200 communicates with the electric device 300 in accordance with two different communication protocols, respectively. Note that the communication device 200 communicates with the electric device 300 in accordance with a control signal or a user instruction supplied from the terminal device 400, or, an automatic program. Typically, the communication device 200 is a control device that remotely controls the electric device 300. The communication device 200 has a function to be connected with the first internal electric communication network 600, the second internal electric communication network 700, and the external electric communication network 800. A remote control to the electric device 300 that utilizes the terminal device 400 is realized by a relay function of the communication device 200. The communication device 200 may be a single-purpose computer or may be a general-purpose computer such as a personal computer.

The electric device 300 is a device subjected to control, and is placed in, for example, the house of a user. In this case, although the electric device 300 is unable to be directly connected with the first internal electric communication network 600 and the second internal electric communication network 700, such an electric device is capable of being connected with the first internal electric communication network 600 or the second internal electric communication network 700 via the communication adapter 100. That is, the electric device 300 is capable of exchanging information with the communication adapter 100. In addition, the electric device 300 has a function of operating in accordance with a control detail instructed from the communication device 200. The electric device 300 is, for example, an air conditioner, a water heater, an electric heater, a rice cooker, a lighting device, or an electric carpet. In this embodiment, basically, the explanation will be given of an example case in which the electric device 300 is an air conditioner.

The terminal device 400 remotely controls the electric device 300 in accordance with an instruction from the user. Note that the terminal device 400 sends, to the communication device 200, a control signal for remotely controlling the electric device 300. In this case, the control signal is for transmitting pieces of information that includes, for example, information on a transmission-originator terminal device (terminal device 400), information on a transmission-destination electric device (electric device 300), and information on the control detail. The terminal device 400 has a function of being connected with the external electric communication network 800. The terminal device 400 is, for example, a smartphone, a cellular phone, or a tablet terminal.

The server 500 is a device that provides, to the communication device 200, various pieces of information to be utilized by the communication device 200. The server 500 includes, for example, a storage device that stores a program for firmware updating and streaming data. The server 500 includes the storage device that stores those pieces of information. In addition, the server 500 has a function of being connected with the external electric communication network 800.

The first internal electric communication network 600 is an electric communication network such as a wireless Local Area Network (LAN) established in the house. The first internal electric communication network 600 connects the communication adapter 100 and the communication device 200 with each other. The first internal electric communication network 600 relays communication in accordance with a first communication protocol. The first communication protocol is, for example, a communication protocol that is suitable for securely transmitting the control signal for the remote control.

The second internal electric communication network 700 is an electric communication network such as a wireless LAN established in the house. The second internal electric communication network 700 connects the communication adapter 100 and the communication device 200 with each other. The second internal electric communication network 700 relays communication in accordance with a second communication protocol that is a different communication protocol from the first communication protocol. The second communication protocol is, for example, a communication protocol that is dedicated for a specific function. The second communication protocol is, for example, a communication protocol suitable to transfer, at a fast speed, a large amount of data, such as streaming data or data for firmware updating.

The external electric communication network 800 is an electric communication network such as the Internet established outside the house. The external electric communication network 800 connects the communication device 200, the terminal device 400, and the server 500 to one another. In order to easily understand, a router, a gateway, and the like are not illustrated in FIG. 1.

Figure 2:
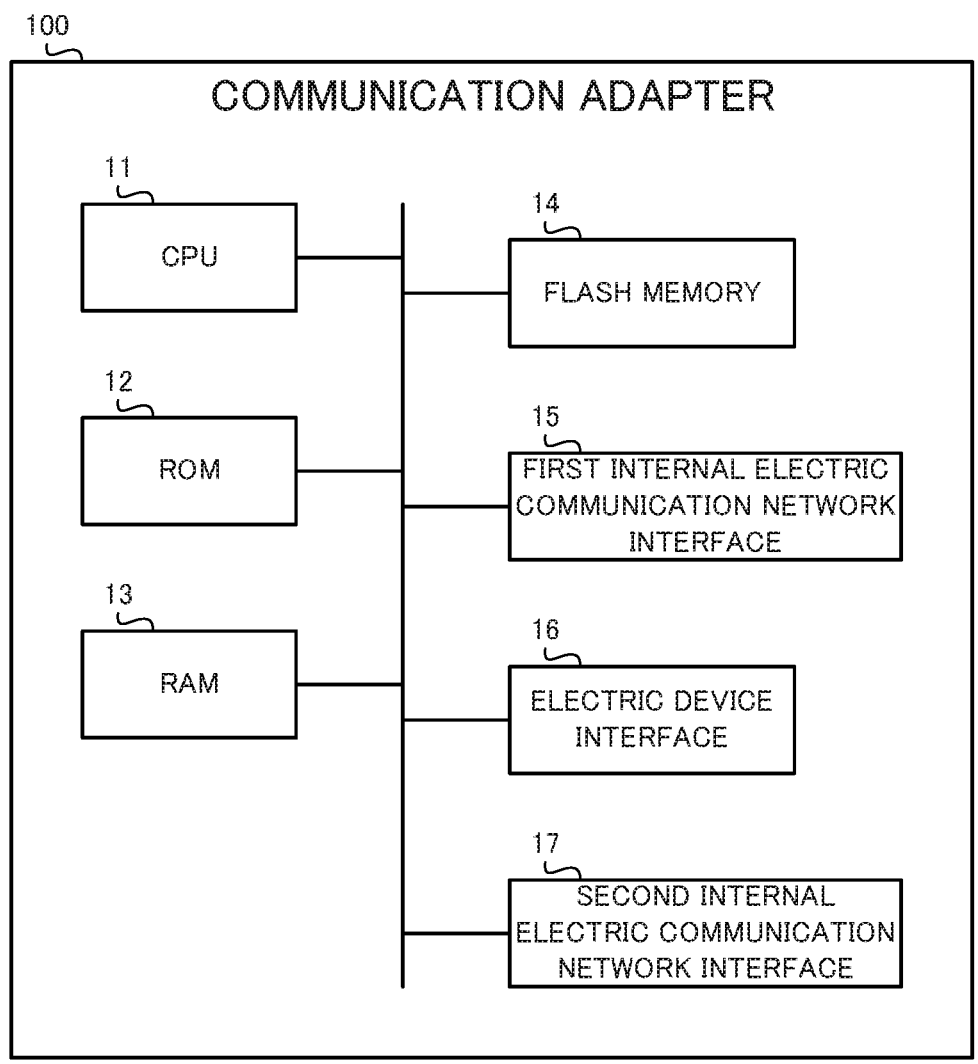
FIG. 2 is a component diagram of a communication adapter according to the first embodiment of the present disclosure.

Next, with reference to FIG. 2, an explanation will be given of a physical structure of the communication adapter 100. As illustrated in FIG. 2, the communication adapter 100 includes a Central Processing Unit (CPU) 11, a Read Only Memory (ROM) 12, a Random Access Memory (RAM) 13, a flash memory 14, a first internal electric communication network interface 15, an electric device interface 16, and a second internal electric communication network interface 17. Each component of the communication adapter 100 is connected to one another via a bus.

The CPU 11 controls the entire operation of the communication adapter 100. Note that the CPU 11 operates in accordance with a program stored in the ROM 12, and utilizes the RAM 13 as a work area.

The ROM 12 stores the program and the data for controlling the entire operation of the communication adapter 100.

The RAM 13 functions as the work area for the CPU 11. That is, the CPU 11 temporarily writes the program and the data in the RAM 13, and refers to those program and data as needed.

The flash memory 14 is a non-volatile memory that stores various types of information. For example, the flash memory 14 stores standardized information and unstandardized information acquired from the electric device 300.

The first internal electric communication network interface 15 is an interface for connecting the communication adapter 100 with the first internal electric communication network 600 by the first communication protocol. The first internal electric communication network interface 15 includes, for example, a LAN interface such as a Network Interface Card (NIC).

The electric device interface 16 is an interface to electrically connect the communication adapter 100 with the electric device 300.

The second internal electric communication network interface 17 is an interface for connecting the communication adapter 100 with the second internal electric communication network 700 based on the second communication protocol. The second internal electric communication network interface 17 includes, for example, a LAN interface such as an NIC.

Figure 3:
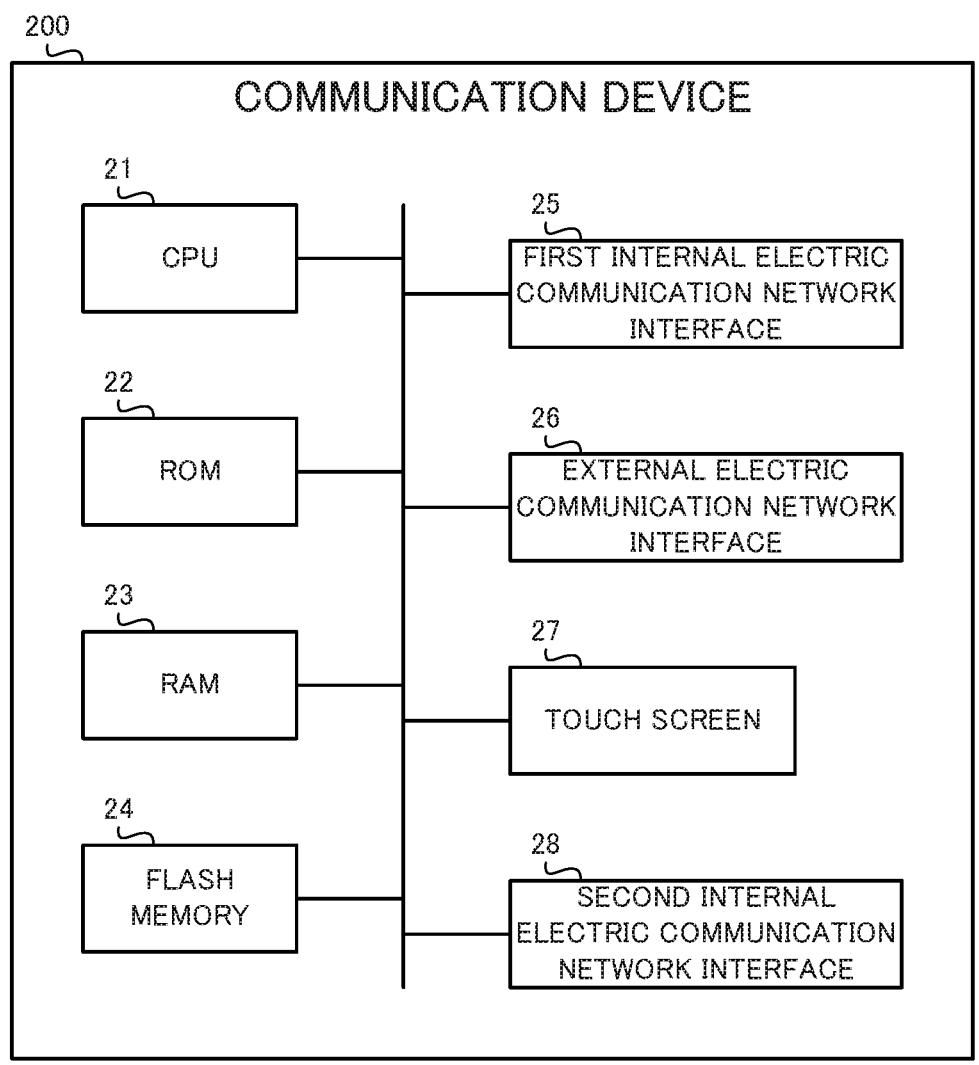
FIG. 3 is a component diagram of a communication device according to the first embodiment of the present disclosure.

Next, with reference to FIG. 3, an explanation will be given of a physical structure of the communication device 200. As illustrated in FIG. 3, the communication device 200 includes a CPU 21, a ROM 22, a RAM 23, a flash memory 24, a first internal electric communication network interface 25, an external electric communication network interface 26, a touch screen 27, and a second internal electric communication network interface 28. Each component of the communication device 200 is connected to one another via a bus.

The CPU 21 controls the entire operation of the communication device 200. Note that the CPU 21 operates in accordance with a program stored in the ROM 22, and utilizes the RAM 23 as a work area.

The ROM 22 stores the program and the data for controlling the entire operation of the communication device 200.

The RAM 23 functions as the work area for the CPU 21. That is, the CPU 21 temporarily writes the program and the data in the RAM 23, and refers to those program and data as needed.

The flash memory 24 is a non-volatile memory that stores various types of information. For example, the flash memory 24 stores standardized information and unstandardized information acquired from the communication adapter 100. Note that instead of the flash memory 24, the communication device 200 may include a hard disk.

The first internal electric communication network interface 25 is an interface for connecting the communication device 200 with the first internal electric communication network 600 by the first communication protocol. The first internal electric communication network interface 25 exchanges, via the first internal electric communication network 600, an electric message with the electric device 300. The first internal electric communication network interface 25 includes, for example, a LAN interface such as an NIC.

The external electric communication network interface 26 is an interface for connecting the communication device 200 with the external electric communication network interface 800. The external electric communication network interface 26 communicates with the terminal device 400 and the server 500 in accordance with a control by the CPU 21. The external electric communication network interface 26 includes, for example a LAN interface such as an NIC.

The touch screen 27 detects a touch operation given by the user, and supplies, to the CPU 21, a signal indicating a detection result. In addition, the touch screen 27 displays an image based on image signals supplied from the CPU 21 or the like. As explained above, the touch screen 27 functions as the user interface of the communication device 200. Hence, the user is capable of controlling the electric device 300 by giving a touch operation to the touch screen 27.

The second internal electric communication network interface 28 is an interface for connecting the communication device 200 with the second internal electric communication network 700 based on the second communication protocol. The second internal electric communication network interface 28 exchanges, via the second internal electric communication network 700 at a fast speed, a large amount of data with the electric device 300. The second internal electric communication network interface 28 includes, for example, a LAN interface such as an NIC.

Figure 4:
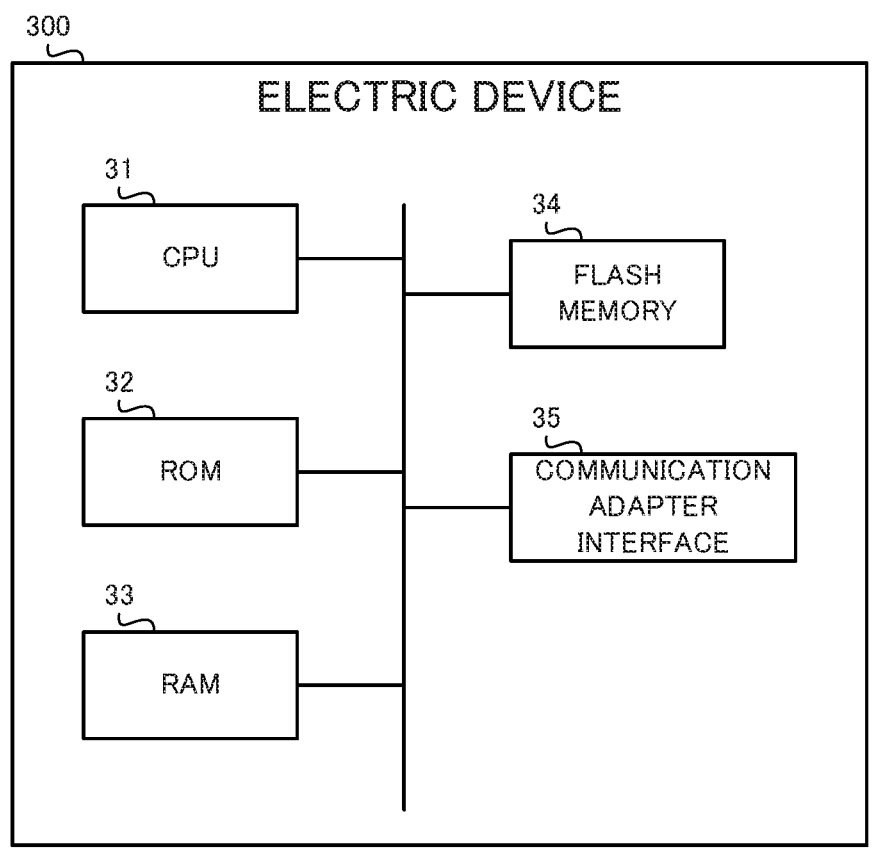
FIG. 4 is a component diagram of an electric device according to the first embodiment of the present disclosure.

Next, with reference to FIG. 4, an explanation will be given of a physical structure of the electric device 300. As illustrated in FIG. 4, the electric device 300 includes a CPU 31, a ROM 32, a RAM 33, a flash memory 34, and a communication adapter interface 35. Each component of the electric device 300 is connected to one another via a bus.

The CPU 31 controls the entire operation of the electric device 300. Note that the CPU 31 operates in accordance with a program stored in the ROM 32, and utilizes the RAM 33 as a work area.

The ROM 32 stores the program and the data for controlling the entire operation of the electric device 300.

The RAM 33 functions as the work area for the CPU 31. That is, the CPU 31 temporarily writes the program and the data in the RAM 33, and refers to those program and data as needed.

The flash memory 34 is a non-volatile memory that stores various types of information. For example, the flash memory 34 stores standardized information and unstandardized information. For example, the standardized information and the unstandardized information are written in the flash memory 34 at the time of, for example, manufacturing of the electric device 300 by a manufacturer or the like.

The communication adapter interface 35 is an interface to electrically connect the electric device 300 with the communication adapter 100.

Next, with reference to FIG. 5, a basic function of the communication adapter 100 and that of the communication device 200 will be explained. The communication adapter 100 includes, as a functional structure, a standardized information acquirer 101, a standardized telegraphic message sender 102, an unstandardized information acquirer 103, an unstandardized telegraphic message receiver 104, an unstandardized telegraphic message sender 105, a standardized telegraphic message receiver 106, and a process executor 107.

The standardized information acquirer 101 acquires, from the electric device 300, the standardized information that represents information which is standardized. The standardized information will be explained later in detail. The standardized information acquirer 101 includes, for example, the CPU 11 and the electric device interface 16.

The standardized telegraphic message sender 102 sends, to the communication device 200, a standardized telegraphic message which includes the standardized information acquired by the standardized information acquirer 101 and which represents a telegraphic message that is standardized. Note that the standardized telegraphic message sender 102 is capable of sending various standardized telegraphic messages to the communication device 200. The standardized telegraphic message will be explained later in detail. The standardized telegraphic message sender 102 includes, for example, the CPU 11 and the first internal electric communication network interface 15.

The unstandardized information acquirer 103 acquires, from the electric device 300, the unstandardized information that represents information which is not standardized. The unstandardized information may include unstandardized telegraphic message creation information to create the unstandardized telegraphic message that is for utilizing an unstandardized function which is a function not standardized. In addition, the unstandardized information is capable of including a user interface creation information that is to create a user interface applied for utilizing the unstandardized function. The unstandardized information will be explained later in detail. The unstandardized information acquirer 103 includes, for example, the CPU 11 and the electric device interface 16.

The unstandardized telegraphic message receiver 104 receives, from the communication device 200, the unstandardized telegraphic message which includes request information of the unstandardized information, and which represents a telegraphic message that is not standardized. Note that the unstandardized telegraphic message receiver 104 is capable of receiving various unstandardized telegraphic messages from the communication device 200. The unstandardized telegraphic message will be explained later in detail. The unstandardized telegraphic message receiver 104 includes, for example, the first internal electric communication network interface 15.

The unstandardized telegraphic message sender 105 sends, to the communication device 200, the unstandardized telegraphic message which includes the unstandardized information acquired by the unstandardized information acquirer 103 when the unstandardized telegraphic message receiver 104 receives the unstandardized telegraphic message including the request information. Note that the unstandardized telegraphic message sender 105 is capable of sending various unstandardized telegraphic messages to the communication device 200. The unstandardized telegraphic message sender 105 includes, for example, the CPU 11 and the first internal electric communication network interface 15.

The standardized telegraphic message receiver 106 receives various standardized telegraphic messages from the communication device 200. The standardized telegraphic message receiver 106 includes, for example, the first internal electric communication network interface 15.

The process executor 107 executes processes relevant to the unstandardized function when the unstandardized telegraphic message receiver 104 of the communication adapter 100 receives the unstandardized telegraphic message for utilizing the unstandardized function. In addition, the process executor 107 is capable of executing various processes. For example, the process executor 107 is capable of creating various telegraphic messages to be sent to the communication device 200. Still further, the process executor 107 is capable of executing processes based on various telegraphic messages received from the communication device 200. The process executor 107 includes, for example, the CPU 11.

On the other hand, the communication device 200 includes, as a functional structure, a standardized telegraphic message receiver 201, an electric device determiner 202, an unstandardized telegraphic message sender 203, an unstandardized telegraphic message receiver 204, a standardized telegraphic message sender 205, and a process executor 206.

The standardized telegraphic message receiver 201 receives the standardized telegraphic message that includes the standardized information sent by the standardized telegraphic message sender 102 of the communication adapter 100. In addition, the standardized telegraphic message receiver 201 is capable of receiving, from the communication adapter 100, various standardized telegraphic messages. The standardized telegraphic message receiver 201 includes, for example, the first internal electric communication network interface 25.

The electric device determiner 202 determines, based on the standardized information included in the standardized telegraphic message including the standardized information received by the standardized telegraphic message receiver 201, whether or not the electric device 300 meets a specific condition. Various determination methods are applicable for the determination to be made by the electric device determiner 202. When, for example, the manufacturer of the electric device 300 is a specific manufacturer, and the manufacturing time period of the electric device 300 is later than a specific time period, a determination method of determining that the electric device 300 meets the specific condition is applicable. In this case, the electric device determiner 202 is capable of determining that the electric device 300 meets the specific condition when determining that the manufacturer indicated by the standardized information is the specific manufacturer, and the manufacturing date indicated by the standardized information is later than the specific time period. Note that this specific condition is, typically, a condition to determine whether or not the electric device 300 is holding the unstandardized information, that is, whether or not the electric device 300 has the unstandardized function that is a function not standardized. The electric device determiner 202 includes, for example, the CPU 21.

The unstandardized telegraphic message sender 203 sends, to the communication adapter 100, the unstandardized telegraphic message that includes the request information of the unstandardized information when the electric device determiner 202 determines that the electric device 300 meets the specific condition. In addition, the unstandardized telegraphic message sender 203 is capable of sending, to the communication adapter 100, various unstandardized telegraphic messages. The unstandardized telegraphic message sender 203 includes, for example, the CPU 21 and the first internal electric communication network interface 25.

The unstandardized telegraphic message receiver 204 receives the unstandardized telegraphic message that includes the unstandardized information sent by the unstandardized telegraphic message sender 105 of the communication adapter 100. In addition, the unstandardized telegraphic message receiver 204 receives, from the communication adapter 100, various unstandardized telegraphic messages. The unstandardized telegraphic message receiver 204 includes, for example, the first internal electric communication network interface 25.

The standardized telegraphic message sender 205 is capable of sending various standardized telegraphic messages to the communication adapter 100. The standardized telegraphic message sender 205 includes, for example, the CPU 21 and the first internal electric communication network interface 25.

The process executor 206 creates, based on the unstandardized telegraphic message creation information included in the unstandardized information, the unstandardized telegraphic message for utilizing the unstandardized function. In addition, the process executor 206 creates, based on the user interface creation information included in the unstandardized information, the user interface, and creates, in accordance with information given to the created user interface, the unstandardized telegraphic message for utilizing the unstandardized function. In addition, the process executor 206 is capable of executing various processes. For example, the process executor 206 is capable of creating various telegraphic messages to be sent to the communication adapter 100. Still further, the process executor 206 is capable of executing processes based on various telegraphic messages received from the communication adapter 100. The process executor 206 includes, for example, the CPU 21.

Next, with reference to FIG. 6A and FIG. 6B, the standardized information and the unstandardized information will be explained.

Standardized information is, for example, information which is standardized based on device standards, and other regulations, and the like, and which is held by the electric device 300. The standardized information includes necessary information for utilizing the standardized function that is a function standardized based on the device standards and other regulations, and the like. For example, the standardized information includes necessary information for creating the standardized telegraphic message for utilizing the standardized function. In the case of, for example, a communication system that utilizes an object-orientation programming, the standardized information includes necessary information for specifying a class applied for utilizing the standardized function. Note that the standardized information may be information prepared for each type of electric device (for example, for each type, such as air conditioner, heater), or may be information prepared commonly for all electric devices.

The standardized information includes, for example, as illustrated in FIG. 6A, standardized device information, standardized function information, standardized-device-information acquisition telegraphic message information, and standardized-function utilization telegraphic message information. The standardized device information is device information related to the electric device 300 which is standardized. The standardized device information is information to identify, for example, the manufacturer of the electric device 300 (for example, a manufacturer code), and the time period at which the electric device 300 was manufactured (for example, manufacturing date). The standardized function information is information that indicates the standardized function of the electric device 300. The standardized function information is information to specify, for example, a power-ON function, a power-OFF function, and a time setting function. The standardized-device-information acquisition telegraphic message information is information to create the standardized telegraphic message to be utilized to obtain the standardized device information. The standardized-function utilization telegraphic message information is information to create the standardized telegraphic message to be used for utilizing the standardized function.

On the other hand, the unstandardized information is information which is information not standardized based on, for example, the device standards and other regulations, and which is held by the electric device 300. The unstandardized information includes, for example, necessary information for utilizing the unstandardized function that is a function not standardized based on the device standards and other regulations. For example, the unstandardized information includes necessary information for creating the unstandardized telegraphic message for utilizing the unstandardized function. In the case of, for example, a system that utilizes an object-orientation programming, the unstandardized information includes necessary information for specifying a class applied for utilizing the unstandardized function. Note that the unstandardized information may be information prepared for each type of electric device (for example, for each type, such as air conditioner, heater), or may be information prepared commonly for all electric devices.

The unstandardized information includes, for example, as illustrated in FIG. 6B, unstandardized device information, unstandardized function information, unstandardized-device-information acquisition telegraphic message information, and unstandardized-function utilization telegraphic message information. The unstandardized device information is device information related to the electric device 300 which is not standardized. The unstandardized device information is, for example, information to identify whether or not the electric device 300 meets a device standard unique to the manufacturer, and information to identify whether or not the electric device 300 is a device meeting energy saving standards. The unstandardized function information is information that indicates the unstandardized function of the electric device 300. For example, the unstandardized function information is information that indicates such as a firmware updating function, and a data transfer function based on a specific communication protocol. The unstandardized-device-information acquisition telegraphic message information is information to create the unstandardized telegraphic message to be utilized to obtain the unstandardized device information. The unstandardized-function utilization telegraphic message information is information to create the unstandardized telegraphic message to be used for utilizing the unstandardized function.

Next, with reference to FIG. 7A and FIG. 7B, the standardized telegraphic message and the unstandardized telegraphic message will be explained.

The standardized telegraphic message is to transmit the standardized information, and is a telegraphic message that is standardized. The standardized telegraphic message is capable of including, for example, as illustrated in FIG. 7A, a telegraphic message format, a telegraphic message code, a transmission-destination address, a transmission-originator address, and a telegraphic message detail. The telegraphic message format is information that indicates the format of the telegraphic message. The telegraphic message format is, for example, information to distinguish whether the telegraphic message is the standardized telegraphic message or the unstandardized telegraphic message. The telegraphic message code is information indicating the type of telegraphic message. The transmission-originator address is information indicating the Internet Protocol (IP) address of the sender of the telegraphic message. The transmission-destination address is information indicating the IP address of the receiver of the telegraphic message. The telegraphic message detail is information indicating the body of the telegraphic message. The standardized telegraphic message illustrated in FIG. 7A is an example standardized telegraphic message that is sent from the electric device 300 to the communication device 200 in response to an inquiry for the device status.

The unstandardized telegraphic message is to transmit the unstandardized information, and is a telegraphic message that is not standardized. The unstandardized telegraphic message is capable of including, for example, as illustrated in FIG. 7B, a telegraphic message format, a telegraphic message code, a transmission-destination address, a transmission-originator address, and a telegraphic message detail. The telegraphic message format is information that indicates the format of the telegraphic message. The difference between the unstandardized telegraphic message and the standardized telegraphic message is, basically, whether the detail to be transmitted is information that is standardized or not. The unstandardized telegraphic message illustrated in FIG. 7B is an example unstandardized telegraphic message that is sent from the communication device 200 to the electric device 300 in order to request a list of unstandardized functions held by the electric device 300.

Figure 8:
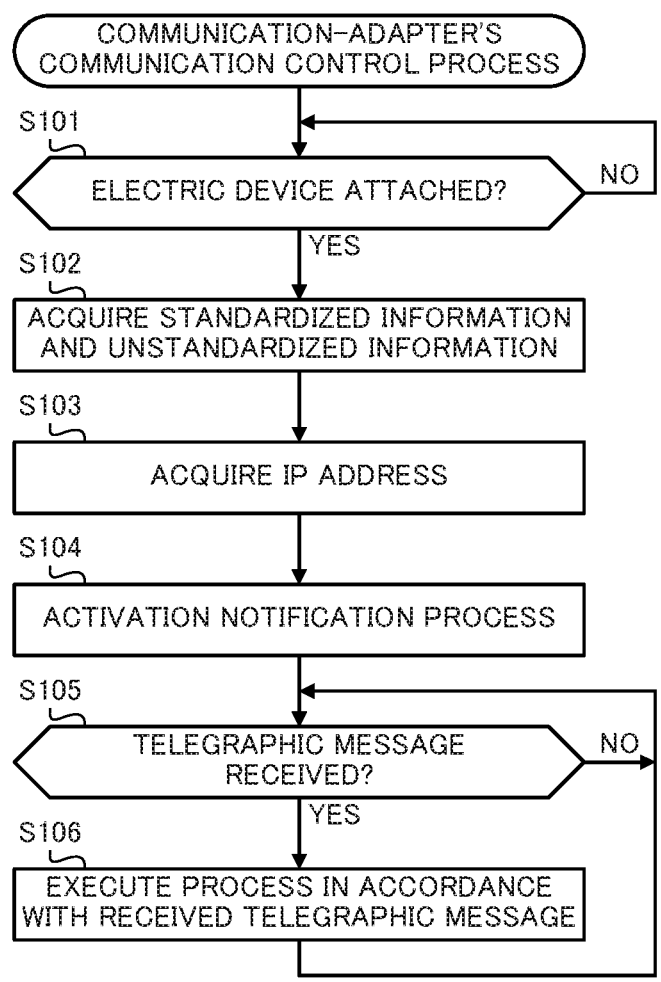
FIG. 8 is a flowchart illustrating a communication-adapter's communication control process executed by the communication adapter according to the first embodiment of the present disclosure.

Next, with reference to the flowchart of FIG. 8, an explanation will be given of a communication-adapter's communication control process executed by the communication adapter 100. Note that the communication adapter 100 starts the communication-adapter's communication control process illustrated in FIG. 8 upon power activation.

First, the CPU 11 determines whether or not the electric device 300 is attached (step S101). When, for example, a specific signal is generated upon attachment of the electric device 300 to the communication adapter 100, the CPU 11 detects the specific signal, thereby becoming possible to determine that the electric device 300 is attached. In addition, when, for example, power for the communication adapter 100 is supplied from the electric device 300, the CPU 11 always determines in step S101 that the electric device 300 is attached.

When determining that no electric device 300 is attached (step S101: NO), the CPU 11 returns the process to step S101. That is, the CPU 11 repeats the determination in step S101 until determining that the electric device 300 is attached.

Conversely, when determining that the electric device 300 is attached (step S101: YES), the CPU 11 acquires the standardized information and the unstandardized information (step S102). More specifically, the CPU 11 acquires, from the electric device 300 via the electric device interface 16, the standardized information and the unstandardized information, and stores those pieces of information in the flash memory 14. Note that the electric device 300 supplies, to the communication adapter 100 via the communication adapter interface 35, the standardized information and the unstandardized information both stored in the flash memory 34 in response to a request from the communication adapter 100.

When completing the process in step S102, the CPU 11 acquires an IP address (step S103). More specifically, first, the CPU 11 sends a search signal for a Dynamic Host Configuration Protocol (DHCP) server via the first internal electric communication network interface 15. On the other hand, the communication device 200 receives this server searching signal via the first internal electric communication network interface 25. Next, the communication device 200 sends, to the communication adapter 100 via the first internal electric communication network interface 25, the IP address allocated to the communication adapter 100 and the IP address allocated to the communication device 200. The CPU 11 receives, via the first internal electric communication network interface 15, the IP addresses sent from the communication device 200. The CPU 11 is capable of communicating with the communication device 200 by utilizing the received IP addresses.

When completing the process in step S103, the CPU 11 executes an activation notification process (step S104). More specifically, the CPU 11 sends, to the communication device 200 via the first internal electric communication network interface 15, the standardized telegraphic message that includes an activation notification to the effect that communication with the communication device 200 is ready. In addition, the CPU 11 is capable of sending, to the communication device 200, the standardized information that includes not only the activation notification but also information related to the electric device 300. Example information related to the electric device 300 is a part of the standardized information stored in the flash memory 14.

When completing the process in step S104, the CPU 11 determines whether or not the telegraphic message has been received (step S105). More specifically, the CPU 11 checks, for example, a signal or the like supplied from the first internal electric communication network interface 15, and determines whether the standardized telegraphic message or the unstandardized telegraphic message has been received. When determining that no telegraphic message has been received (step S105: NO), the CPU 11 returns the process to the step S105. That is, the CPU 11 repeats the process in step S105 until determining that the telegraphic message has been received.

Conversely, when determining that either telegraphic message has been received (step S105: YES), the CPU 11 executes the process in accordance with the received telegraphic message (step S106). The process in accordance with the received telegraphic message is, for example, a control process to the electric device 300 and a sending process of a control result, an acquiring process of the status of the electric device 300 and a sending process of information indicating the acquired status, an acquiring process of the standardized information and the unstandardized information and a sending process of information indicating the acquired information, or the like. In this embodiment, the process in accordance with the received telegraphic message is configured to include a process of returning any telegraphic message.

Note that the communication device 200 is configured to send, to the communication adapter 100, the standardized telegraphic message that requests the sending of the standardized information as a registration process of the communication adapter 100 and the electric device 300. Hence, in response to the received standardized telegraphic message that requests the sending of the standardized information, the communication adapter 100 acquires the standardized information from the flash memory 14, and sends, to the communication device 200 via the first internal electric communication network interface 25, the standardized telegraphic message that includes the acquired standardized information.

In addition, when determining that the electric device 300 is an electric device that meets the specific condition, the communication device 200 sends, to the communication adapter 100, the unstandardized telegraphic message that requests the sending of the unstandardized information. In this case, in response to the received unstandardized telegraphic message that requests the sending of the unstandardized information, the communication adapter 100 acquires the unstandardized information from the flash memory 14, and sends, to the communication device 200 via the first internal electric communication network interface 25, the unstandardized telegraphic message that includes the acquired unstandardized information.

When completing the process in step S106, the CPU 11 returns the process to step S105. That is, the CPU 11 repeats the processes in step S105 and in step S106 until the communication adapter 100 is deactivated.

Figure 9:
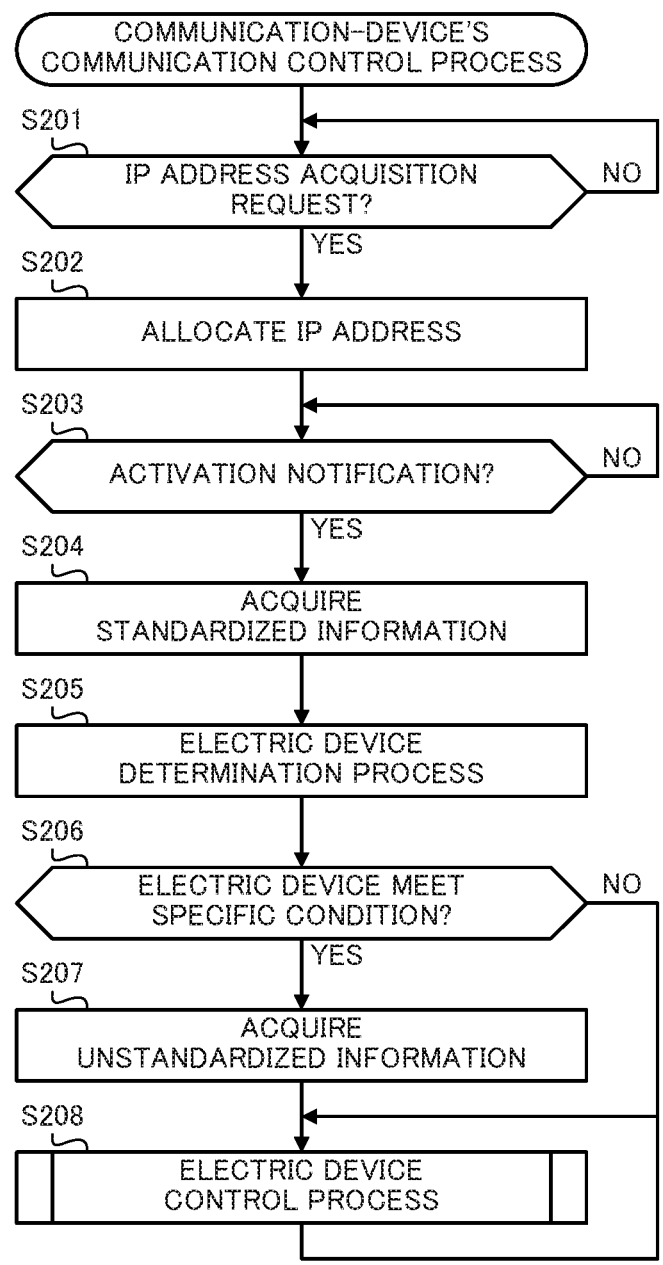
FIG. 9 is a flowchart illustrating a communication-device's communication control process executed by the communication device according to the first embodiment of the present disclosure.

Next, with reference to the flowchart of FIG. 9, an explanation will be given of a communication-device's communication control process executed by the communication device 200. Note that the communication device 200 starts the communication-device's communication control process illustrated in FIG. 9 upon power activation. Note that the processes from step S201 to step S207 to be explained below correspond to the registration process of the communication adapter 100 and the electric device 300.

First, the CPU 21 determines whether or not there is an acquisition request of the IP address (step S201). For example, the CPU 21 monitors a signal supplied from the first internal electric communication network interface 25, thereby determining whether or not a search signal sent from the communication adapter 100 has been received. When determining that there is no acquisition request of the IP address (step S201: NO), the CPU 21 returns the process to step S201. That is, the CPU 21 repeats the process in step S201 until determining that there is an acquisition request of the IP address.

Conversely, when determining that there is an acquisition request of the IP address (step S201: YES), the CPU 21 allocates the IP address to the communication adapter 100 (step S202). For example, the CPU 21 refers to an address management table stored in, for example, the flash memory 24, and specifies an IP address not allocated yet. The CPU 21 updates the address management table with the specified IP address being as the IP address of the communication adapter 100. Next, the CPU 21 sends, to the communication adapter 100 via the first internal electric communication network interface 25, the standardized telegraphic message that includes the specified IP address. As explained above, the communication device 200 has a function to serve as the DHCP server. The CPU 21 is capable of communicating with the communication adapter 100 by utilizing the specified IP address.

When completing the process in step S202, the CPU 21 determines whether or not there is an activation notification (step S203). For example, the CPU 21 monitors a signal supplied from the first internal electric communication network interface 25, thereby determining whether or not the standardized telegraphic message that includes the activation notification sent from the communication adapter 100 has been received. When determining that there is no activation notification (step S203: NO), the CPU 21 returns the process to step S203. That is, the CPU 21 repeats the process in step S203 until determining that there is the activation notification.

Conversely, when determining that there is the activation notification (step S203: YES), the CPU 21 acquires the standardized information (step S204). The scheme of the CPU 21 to acquire the standardized information is adjustable as needed. For example, the CPU 21 may collectively acquire pieces of standardized information by a single standardized telegraphic message. Alternatively, the CPU 21 may acquire pieces of standardized information by multiple standardized telegraphic messages in multiple batches. In this case, the CPU 21 is capable of sending the standardized telegraphic message that requests the sending of the standardized information to the communication adapter 100 in multiple batches. When, for example, the standardized information is hierarchized by lists, objects, and the like, the CPU 21 acquires the standardized information as needed multiple times in accordance with the hierarchical structure of the standardized information.

First of all, the CPU 21 sends, for example, the standardized telegraphic message that requests the sending of structural information that represents the structure of the standardized information to the communication adapter 100, and receives the standardized telegraphic message that includes the structural information from the communication adapter 100. The CPU 21 specifies individual information one by one in the standardized information based on the structural information. Next, the CPU 21 sends, for each specified individual information, the standardized telegraphic message that requests the sending of the individual information to the communication adapter 100, and receives the standardized telegraphic message that includes the individual information from the communication adapter 100. The CPU 21 stores the acquired standardized information in the flash memory 24.

When completing the process in step S204, the CPU 21 executes the electric device determination process (step S205). More specifically, the CPU 21 determines, based on the standardized information stored in the flash memory 24, whether or not the electric device 300 is an electric device that meets the specific condition. For example, the CPU 21 determines whether or not a manufacturer code indicated by the standardized information is consistent with a predetermined specific manufacturer code stored in the flash memory 24. Note that the specific manufacturer code is, for example, a code of the manufacturer of the communication device 200. That is, when determining that the electric device 300 was manufactured by the manufacturer that manufactured the communication device 200, the CPU 21 is capable of determining that the electric device 300 is an electric device that meets the specific condition. However, the CPU 21 is capable of employing various determination schemes based on the standardized information.

When completing the process in step S205, the CPU 21 determines whether or not the electric device 300 meets the specific condition (step S206). In accordance with a result of the electric device determination process in step S205, the CPU 21 is enabled to determine whether or not the electric device 300 meets the specific condition.

When determining that the electric device 300 meets the specific condition (step S206: YES), the CPU 21 acquires the unstandardized information (step S207). The scheme of the CPU 21 to acquire the unstandardized information is adjustable as needed. For example, the CPU 21 may collectively acquire pieces of unstandardized information in response to a single unstandardized telegraphic message. Alternatively, the CPU 21 may acquire pieces of unstandardized information multiple times. In this case, the CPU 21 is capable of sending the unstandardized telegraphic message that requests the sending of the unstandardized information to the communication adapter 100 multiple times. When, for example, the unstandardized information is hierarchized by lists, objects, and the like, the CPU 21 acquires the unstandardized information as needed multiple times in accordance with the hierarchical structure of the unstandardized information.

First of all, the CPU 21 sends, for example, the unstandardized telegraphic message that requests the sending of structural information that represents the structure of the unstandardized information to the communication adapter 100, and receives the unstandardized telegraphic message that includes the structural information from the communication adapter 100. The CPU 21 specifies individual information one by one in the unstandardized information based on the structural information. Next, the CPU 21 sends, for each specified individual information, the unstandardized telegraphic message that requests the sending of the individual information to the communication adapter 100, and receives the unstandardized telegraphic message that includes the individual information from the communication adapter 100. The CPU 21 stores the acquired unstandardized information in the flash memory 24.

Figure 10:
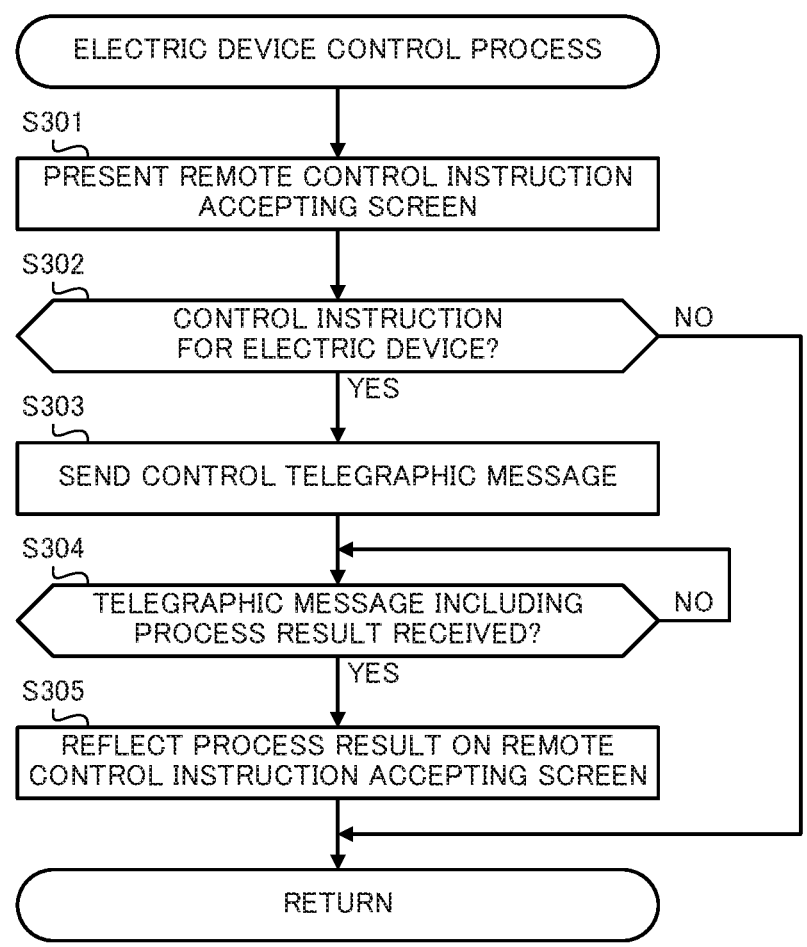
FIG. 10 is a flowchart illustrating an electric device control process in FIG. 9.

When determining that the electric device 300 does not meet the specific condition (step S206: NO), or when completing the process in step S207, the CPU 21 executes an electric device control process (step S208). The electric device control process will be explained in detail below with reference to the flowchart of FIG. 10.

First, the CPU 21 presents a remote control instruction accepting screen (step S301). More specifically, first, the CPU 21 creates, based on the standardized information and the unstandardized information, the remote control instruction accepting screen. When the unstandardized information is stored in the flash memory 24, the CPU 21 creates, based on the standardized information and the unstandardized information both stored in the flash memory 24, the remote control instruction accepting screen. Conversely, when no unstandardized information is stored in the flash memory 24, the CPU 21 creates, based on the standardized information stored in the flash memory 24, the remote control instruction accepting screen.

The CPU 21 supplies, to the touch screen 27, image signals that represent the created remote control instruction accepting screen, and presents the remote control instruction accepting screen on the touch screen 27. The CPU 21 updates the remote control instruction accepting screen as needed in accordance with a touch operation given by the user and a control stage.

When completing the process in step S301, the CPU 21 determines whether or not there is a control instruction to the electric device 300 (step S302). For example, the CPU 21 monitors a signal supplied from the touch screen 27, thereby determining whether or not there is a control instruction from the user. Alternatively, the CPU 21 monitors a signal supplied from the external electric communication network interface 26, thereby determining whether or not there is a control instruction from the user of the terminal device 400. Further alternatively, the CPU 21 determines whether or not there is a control instruction in accordance with the automatic program. When determining that there is no control instruction to the electric device 300 (step S302: NO), the CPU 21 completes the electric device control process.

Conversely, when determining that there is a control instruction to the electric device 300 (step S302: YES), the CPU 21 sends a control telegraphic message (step S303). When the control instruction is a control instruction relevant to the standardized function, the CPU 21 creates, based on the standardized information, and the like, the standardized telegraphic message that includes the control instruction relevant to the standardized function. Conversely, when the control instruction is a control instruction relevant to the unstandardized function, the CPU 21 creates, based on the unstandardized information, and the like, the unstandardized telegraphic message that includes the control instruction relevant to the unstandardized function. The CPU 21 sends, to the communication adapter 100 via the first internal electric communication network interface 25, the created standardized telegraphic message or unstandardized telegraphic message.

When completing the process in step S303, the CPU 21 determines whether or not a telegraphic message that includes a process result has been received (step S304). More specifically, the CPU 21 monitors the first internal electric communication network interface 25, and determines whether or not the standardized telegraphic message or the unstandardized telegraphic message has been received which includes a process result sent from the communication adapter 100.

When determining that no telegraphic message which contains the process result has been received (step S304: NO), the CPU 21 returns the process to step S304. That is, the CPU 21 repeats the process in step S304 until receiving the telegraphic message that includes the process result.

Conversely, when determining that the telegraphic message which includes the process result has been received (step S304: YES), the CPU 21 reflects the process result on the remote control instruction accepting screen (step S305). More specifically, the CPU 21 updates the remote control instruction accepting screen based on the process result included in the received telegraphic message. Next, the CPU 21 supplies, to the touch screen 27, image signals that represent the updated remote control instruction accepting screen. In addition, the touch screen 27 presents the updated remote control instruction accepting screen based on the supplied image signals.

When completing the process in step S305, the CPU 21 completes the electric device control process. When completing the process in step S208, the CPU 21 returns the process to step S208. That is, the CPU 21 repeats the electric device control process while the communication device 200 is being activated.

Figure 11:
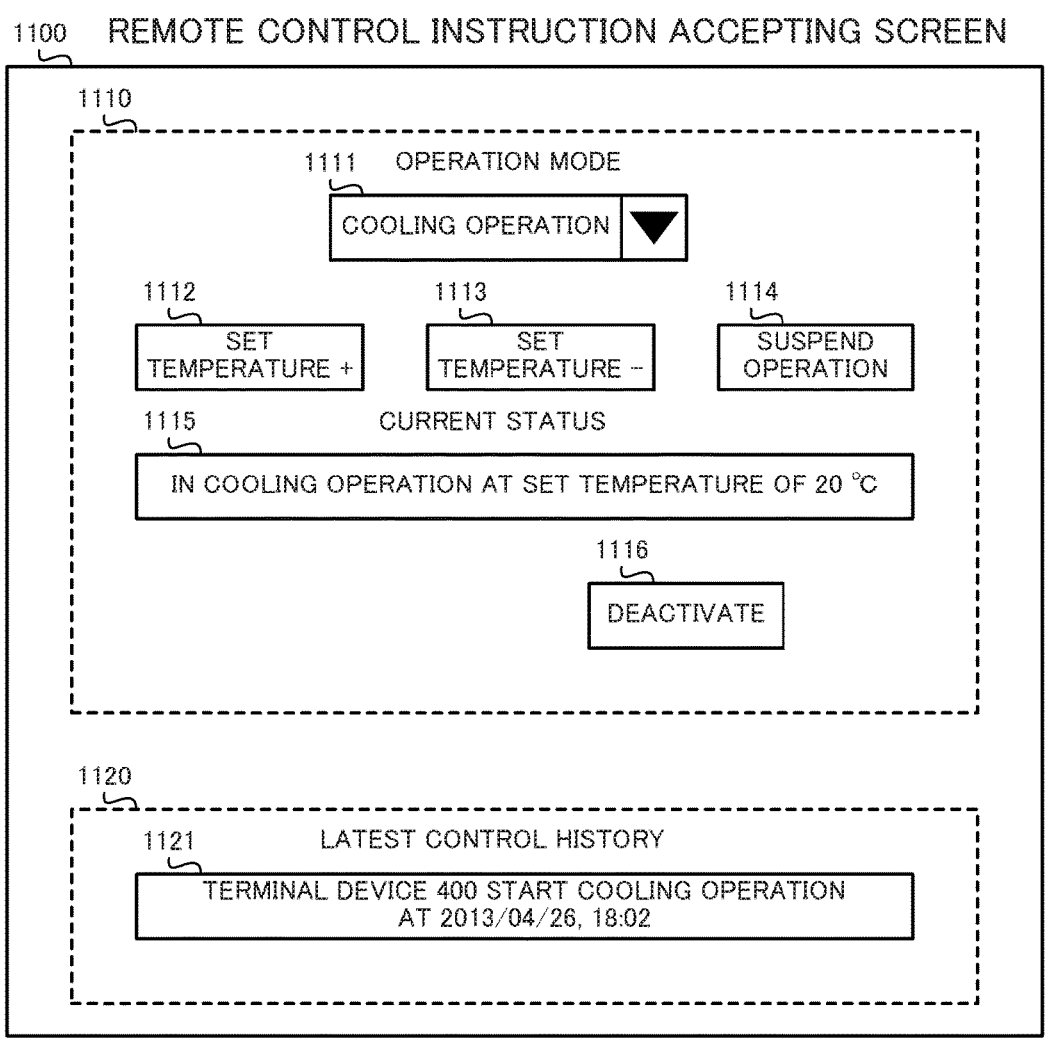
FIG. 11 is a diagram illustrating a remote control instruction accepting screen.

Next, with reference to FIG. 11, an explanation will be given of a remote control instruction accepting screen 1100. The remote control instruction accepting screen 1100 includes, for example, a standardized function utilization field 1110, and an unstandardized function utilization field 1120. The standardized function utilization field 1110 includes a list field 1111, button fields 1112, 1113, 1114, and 1116, and, a display field 1115. The unstandardized function utilization field 1120 includes a display field 1121. Note that FIG. 11 illustrates a screen when the electric device 300 is an air conditioner, the air conditioner has already been activated, and is running for cooling.

The standardized function utilization field 1110 is a field which displays information on the standardized function of the electric device 300, and which accepts a control instruction relevant to the standardized function of the electric device 300. For example, the standardized function utilization field 1110 is created based on the standardized information stored in the flash memory 24, and the detail of the standardized telegraphic message sent from the communication adapter 100 as a response to the standardized telegraphic message created based on that standardized telegraphic message.

The unstandardized function utilization field 1120 is a field which displays information relevant to the unstandardized function of the electric device 300, and which accepts a control instruction relevant to the unstandardized function of the electric device 300. For example, the unstandardized function utilization field 1120 is created based on the unstandardized information stored in the flash memory 24, and the detail of the unstandardized telegraphic message sent from the communication adapter 100 as a response to the unstandardized telegraphic message created based on that unstandardized telegraphic message. Hence, when the electric device 300 has no unstandardized function, the remote control instruction accepting screen 1100 is provided with no unstandardized function utilization field 1120.

The list field 1111 presents the current operation mode, and displays a dropdown list that accepts an instruction to change the operation mode. When a touch operation is given to the list field 1111, a list of candidate operation modes is displayed. Next, when a new operation mode is selected among the displayed candidates, an operation in the newly selected operation mode starts. Hence, a touch operation to the list field 1111 is a remote control instruction. Accordingly, when the list field 1111 accepts a touch operation, the CPU 21 creates the standardized telegraphic message that includes this remote control instruction, and sends this message to the communication adapter 100.

The button field 1112 displays a button that accepts an instruction of turning up a set temperature. The button field 1113 displays a button that accepts an instruction of turning down the set temperature. The button field 1114 displays a button that accepts an instruction of suspending the operation. The button field 1116 displays a button that accepts an instruction of deactivating the air conditioner. A touch operation to any of the button fields 1112, 1113, 1114, and 1116 is a remote control instruction. Hence, when any of the button fields 1112, 1113, 1114, and 1116 accepts a touch operation, the CPU 21 creates the standardized telegraphic message that includes this remote control instruction, and sends this message to the communication adapter 100.

The display field 1115 displays the current status of the electric device 300. Information displayed in the display field 1115 is information included in the standardized telegraphic message sent from the electric device 300 as a response to the standardized telegraphic message that includes a sending request for the information indicating the current status of the electric device 300.

The display field 1121 displays the latest control history. Information displayed in the display field 1121 is information included in the unstandardized telegraphic message sent from the electric device 300 as a response to the standardized telegraphic message that includes a sending request for the latest control history. In FIG. 11, the display field indicates that the latest control to the electric device 300 is a control based on a start instruction for a cooling operation given by the user of the terminal device 400.

According to this embodiment, when the electric device 300 is determined to meet the specific condition based on the standardized information held by the electric device 300, the communication device 200 is enabled to acquire the unstandardized information. Accordingly, when the electric device 300 meets the specific condition, the communication device 200 is capable of acquiring both the standardized information and the unstandardized information. Conversely, when the electric device 300 does not meet the specific condition, the communication device 200 is enabled to acquire only the standardized information. Hence, an effect, of suppressing an erroneous operation of the electric device 300 caused by the communication device 200 that attempts to acquire the unstandardized information which is not held by the electric device 300, is expected.

In addition, according to this embodiment, the communication device 200 is capable of creating the unstandardized telegraphic message used for utilizing the unstandardized function of the electric device 300 based on the unstandardized information acquired from the electric device 300. Hence, when the electric device 300 meets the specific condition, the communication device 200 is enabled to appropriately utilize the unstandardized function. Conversely, when the electric device 300 does not meet the specific condition, the communication device 200 is unable to utilize the unstandardized function. Hence, an effect, of suppressing an erroneous operation of the electric device 300 caused by the communication device 200 that attempts for utilizing the unstandardized function which is not held by the electric device 300, is expected.

In addition, according to this embodiment, the communication device 200 can use the unstandardized function related to the user interface of the electric device 300.

Still further, according to this embodiment, when determining that the manufacturer of the communication device 200 is consistent with the manufacturer of the electric device 300, the communication device 200 is enabled to acquire the unstandardized information held by the electric device 300. Hence, when, for example, there is unstandardized information that has a value in utilization if the manufacturer of the communication device 200 is consistent with the manufacturer of the electric device 300, a control, in such a way that the utilization of the unstandardized information is not restricted when the manufacturer is consistent, and the utilization of the unstandardized information is restricted when the manufacturer is inconsistent, is realizable. In addition, the unstandardized function and the like, uniquely developed by the manufacturer of the electric device 300 is prevented from being inadequately utilized by other manufactures of the communication device 200.

Second Embodiment

In the first embodiment, the explanation was given of an example case in which the unstandardized function that becomes available based on the unstandardized information is the function associated with the user interface. In this embodiment, the unstandardized function that becomes available based on the unstandardized information is not limited to the above example case. According to a communication system of a second embodiment to be explained below, the unstandardized function that becomes available based on the unstandardized information is a communication function based on another communication protocol. In the following explanation, basically, the differences of the communication system according to the second embodiment from the communication system 1000 of the first embodiment will be explained.

A communication adapter 150 of the second embodiment employs the same physical structure as that of the communication adapter 100, and a communication device 250 of the second embodiment employs the same physical structure as that of the communication device 200. An explanation will be given below of a function of the communication adapter 150 according to the second embodiment and a function of the communication device 250 according to the second embodiment with reference to FIG. 12.

Figure 12:
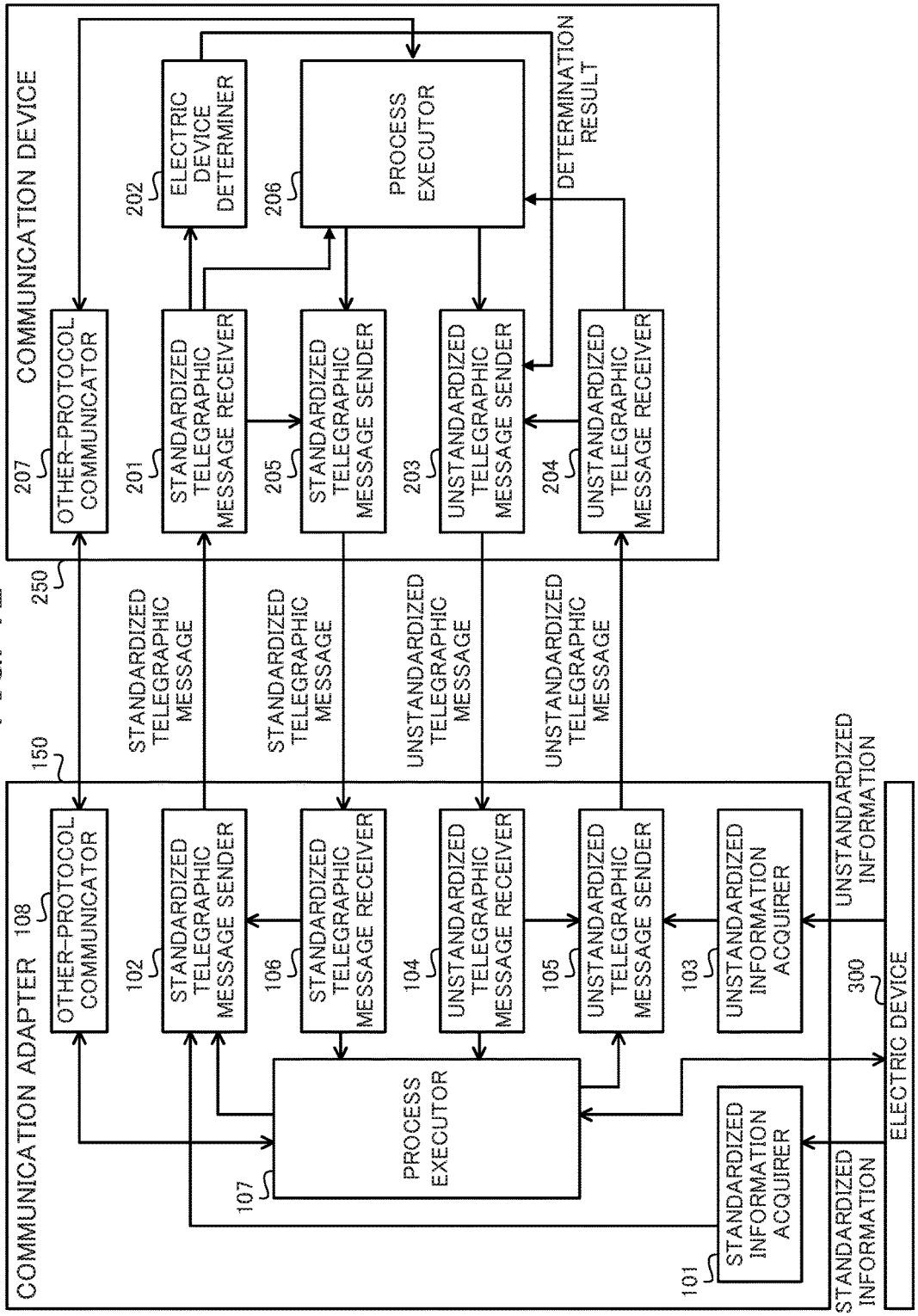
FIG. 12 is a diagram for explaining a function of a communication adapter and that of a communication device according to a second embodiment of the present disclosure.

As illustrated in FIG. 12, the communication adapter 150 includes, as a functional structure, the standardized information acquirer 101, the standardized telegraphic message sender 102, the unstandardized information acquirer 103, the unstandardized telegraphic message receiver 104, the unstandardized telegraphic message sender 105, the standardized telegraphic message receiver 106, the process executor 107, and an other-protocol communicator 108. Here, the functions other than the process executor 107 and the other-protocol communicator 108 are the same as those of the first embodiment explained above.

In addition, as illustrated in FIG. 12, the communication device 250 includes, as a functional structure, the standardized telegraphic message receiver 201, the electric device determiner 202, the unstandardized telegraphic message sender 203, the unstandardized telegraphic message receiver 204, the standardized telegraphic message sender 205, the process executor 206, and an other-protocol communicator 207. Here, the functions other than the process executor 206 and the other-protocol communicator 207 are the same as those of the first embodiment explained above.

The other-protocol communicator 108 communicates with the communication device 250 based on another communication protocol other than the communication protocol that is utilized for the standardized telegraphic message or the unstandardized telegraphic message. The other-protocol communicator 108 includes, for example, the CPU 11 and the second internal electric communication network interface 17.

The other-protocol communicator 207 communicates with the communication adapter 150 based on the other communication protocol as explained above. The other-protocol communicator 207 includes, for example, the CPU 21 and the second internal electric communication network interface 28.

In this case, the process executor 206 of the communication device 250 creates the unstandardized telegraphic message that includes an instruction for communication based on the other communication protocol between the other-protocol communicator 108 of the communication adapter 150 and the other-protocol communicator 207 of the communication device 250. In addition, the process executor 206 controls the other-protocol communicator 207 so as to communicate with the other-protocol communicator 108 based on the other communication protocol.

In addition, the process executor 107 of the communication adapter 150 controls the other-protocol communicator 108 so as to communicate with the other-protocol communicator 207 based on the other communication protocol when the unstandardized telegraphic message receiver 104 receives the unstandardized telegraphic message that includes an instruction for communication based on the other communication protocol.

Note that, as the other communication protocol, adaptation of a communication protocol that is dedicated for, for example, transferring of a large amount of data such as streaming data and firmware updating program data is suitable. In addition, as the other communication protocol, adaptation of a communication protocol that is recommended by the manufacturer of the communication adapter 150 and that of the communication device 250 is also suitable.

According to this embodiment, communication based on multiple communication protocols is enabled between the communication adapter 150 and the communication device 250. According to this embodiment, even if, for example, a standard communication protocol is defined based on regulations such as device standards, in addition to communication based on this standard communication protocol, communication based on the other communication protocol dedicated for the specific function is enabled.

Modified Examples

Embodiments of the present disclosure were explained above, but various changes and modifications in various forms are also possible to carry out the present disclosure.

In the present disclosure, which part of the structures, functions, and operations explained in the first embodiment and the second embodiment is adopted is optional. In addition, to the above explained structures, functions and operations, further structures, functions, and operations may be added. Still further, in the present disclosure, how the communication adapter and the communication device share the functions is not limited to the example cases explained in the first embodiment and the second embodiment.

For example, in the first embodiment, the explanation was given of an example case in which the communication device 200 includes the electric device determiner 202 that determines whether or not the electric device 300 is an electric device which meets the specific condition. According to the present disclosure, for example, the communication adapter 100 may include the electric device determiner 202. In this case, for example, the electric device determiner 202 of the communication adapter 100 compares information for determination such as the manufacturer code included in the standardized telegraphic message sent by the communication device 200 with information such as the manufacturer code included in the standardized information acquired from the electric device 300. Next, when those manufacturer codes are consistent with each other, for example, the unstandardized telegraphic message sender 105 sends the unstandardized telegraphic message that includes the unstandardized information to the communication device 200, and when those manufacturer codes are inconsistent with each other, no unstandardized telegraphic message that includes the unstandardized information is sent to the communication device 200.

Information for determination utilized to determine whether or not the electric device 300 is an electric device that has the standardized information is not limited to the above explained example. For example, arbitrary information (a piece of information or a combination of multiple pieces of information) included in the standardized information may be utilized as the information for determination.

In the first embodiment, the explanation was given of an example case in which the communication device 200 is a control device that controls the electric device 300. When, for example, the electric device 300 is a sensor, the communication device 200 may be a device that simply acquires information supplied from the electric device 300 without controlling the electric device 300.

The unstandardized function that becomes executable based on the unstandardized information is not limited to the above explained function. Possible unstandardized functions are, for example, a unique function recommended by a specific manufacturer, and a special-purpose function provided only for electric devices manufactured in a specific period.

In the first embodiment, an explanation was given of an example case in which, first of all, the communication device 200 sends the telegraphic message to the communication adapter 100, and the communication adapter 100 that receives this telegraphic message sends the telegraphic message to the communication device 200. The procedure of sending the telegraphic message according to the present disclosure is not limited to the above explained scheme. For example, the communication adapter 100 that has received the telegraphic message from the communication device 200 may send no telegraphic message to the communication device 200. Alternatively, for example, the communication adapter 100 may autonomously send the telegraphic message to the communication device 200.

When operation programs that define operations of the communication adapters 100 and 150, and communication devices 200 and 250 of the present disclosure are applied to existing personal computers and information terminal devices, such personal computers and the like are enabled to function as the communication adapters 100 and 150, and communication devices 200 and 250 of the present disclosure.

In addition, how to distribute such programs is optional, and for example, the programs may be distributed in a manner stored in a non-transitory computer-readable recording medium, such as a Compact Disk Read-Only Memory (CD-ROM), a Digital Versatile Disk (DVD), a Magneto Optical Disk (MO), or a memory card, or may be distributed over a communication network such as the Internet.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the priority based on Japanese Patent Application No. 2013-148469 filed on Jul. 17, 2013. The entire disclosure of the specification, claims, and drawings of this application is herein incorporated in this specification by reference.

INDUSTRIAL APPLICABILITY

The present disclosure is applicable to a communication system that includes a communication adapter enabling an electric device to communicate, and a communication device communicating with the communication adapter.

The invention claimed is:
1. A communication system comprising:
a communication adapter adapted to communicate with an electric device, the communication adapter comprises at least one adapter communication interface, an electric device interface, and an adapter processor cooperatively operable with the electric device interface and the at least one adapter communication interface; and
a communication device adapted to communicate with the communication adapter, the communication device comprises at least one communication-device communication interface and a communication-device processor cooperatively operable with the at least one communication-device communication interface, wherein
the adapter processor of the communication adapter is configured to
acquire, via the electric device interface, standardized information from the electric device, wherein the standardized information represents information that is standardized;
send, via the at least one adapter communication interface, to the communication device, a standardized telegraphic message including the standardized information acquired by the adapter processor, wherein the standardized telegraphic message represents a telegraphic message that is standardized;
acquire, via the electric device interface, unstandardized information from the electric device, wherein the unstandardized information represents information that is not standardized;
receive, via the at least one adapter communication interface, from the communication device, a first unstandardized telegraphic message including a request for the unstandardized information, wherein the first unstandardized telegraphic message represents a telegraphic message that is not standardized; and
send, via the at least one adapter communication interface, to the communication device, a second unstandardized telegraphic message including the unstandardized information acquired by the adapter processor when the adapter processor receives the first unstandardized telegraphic message including the request for the unstandardized information, and the communication-device processor of the communication device is configured to:
receive, via the at least one communication-device communication interface, from the adapter processor of the communication adapter, the standardized telegraphic message;
determine whether the electric device holds the unstandardized information based on the standardized information included in the standardized telegraphic message received by the communication-device processor;
send, via the at least one communication-device communication interface, to the communication adapter, the first unstandardized telegraphic message including the request for the unstandardized information when the electric device is determined by the communication-device processor to hold the unstandardized information;
receive, via the at least one communication-device communication interface, from the adapter processor of the communication adapter, the second unstandardized telegraphic message including the unstandardized information; and
create, based on unstandardized telegraphic message creation information included in the unstandardized information, a third unstandardized telegraphic message for utilizing an unstandardized function that is a function not standardized, wherein the standardized information includes information that indicates a manufacturer of the electric device; and
the communication-device processor of the communication device is further configured to determine that, in response to the manufacturer indicated by the standardized information being a pre-specified manufacturer, the electric device holds the unstandardized information.

2. The communication system according to claim 1, wherein:
the communication-device processor of the communication device is further configured to:
send, to the communication adapter, via the at least one communication-device interface, the third unstandardized telegraphic message for utilizing the unstandardized function, the third unstandardized telegraphic message being created by the communication-device processor;
the adapter processor of the communication adapter is further configured to:

receive, from the communication device, via the at least one adapter communication interface, the third unstandardized telegraphic message for utilizing the unstandardized function; and
execute a process relevant to the unstandardized function when the adapter processor receives the third unstandardized telegraphic message for utilizing the unstandardized function.

3. The communication system according to claim 2, wherein:
the unstandardized information includes user interface creation information for creating a user interface applied for utilizing the unstandardized function; and
the communication-device processor of the communication device is further configured to:
create the user interface based on the user interface creation information included in the unstandardized information, and
create, in accordance with information given to the created user interface, the third unstandardized telegraphic message for utilizing the unstandardized function.

4. The communication system according to claim 2, wherein:
wherein the standardized telegraphic message, the first unstandardized telegraphic message, and the second unstandardized telegraphic message are sent using a first communication protocol,
the adapter processor of the communication adapter is further configured to:
communicate with the communication device, via the at least one adapter communication interface, based on a second communication protocol different from the first communication protocol;
the communication-device processor of the communication device is further configured to:
communicate with the communication adapter based on the second communication protocol; and
create a fourth unstandardized telegraphic message that includes an instruction for communication between the adapter processor of the communication adapter and the communication-device processor of the communication device based on the second communication protocol.

5. A communication device that communicates with a communication adapter provided for communication of an electric device, the communication device comprising:
at least one communication-device communication interface, and a communication-device processor cooperatively operable with the at least one communication-device communication interface,
the communication-device processor is configured to
receive, via the at least one communication-device communication interface, from the communication adapter, a standardized telegraphic message including standardized information acquired from the electric device, wherein the standardized telegraphic message represents a telegraphic message that is standardized, and the standardized information represents information that is standardized;
determine whether the electric device holds unstandardized information based on the standardized information included in the standardized telegraphic message received by the communication-device processor, wherein the unstandardized information is not standardized;

send, via the at least one communication-device communication interface, to the communication adapter, a first unstandardized telegraphic message including a request for the unstandardized information acquired from the electric device when the electric device is determined by the communication-device processor of the communication device to hold the unstandardized information, wherein the first unstandardized telegraphic message represents a telegraphic message that is not standardized;

receive, from the communication adapter, via the at least one communication-device communication interface, a second unstandardized telegraphic message including the unstandardized information sent by the communication adapter; and create, based on unstandardized telegraphic message creation information included in the unstandardized information, a third unstandardized telegraphic message for utilizing an unstandardized function that is a function not standardized, wherein the standardized information includes information that indicates a manufacturer of the electric device; and the communication-device processor of the communication device is further configured to determine that, in response to the manufacturer indicated by the standardized information being a pre-specified manufacturer, the electric device holds the unstandardized information.

6. A communication adapter enabling an electric device to communicate with a communication device, the communication adapter comprising:

at least one adapter communication interface, an electric device interface, and an adapter processor cooperatively operable with the electric device interface and the at least one adapter communication interface, wherein the adapter processor is configured to acquire, via the electric device interface, standardized information from the electric device, wherein the standardized information represents information that is standardized;

determine whether the electric device holds the unstandardized information based on the standardized information acquired by the adapter processor, wherein the unstandardized information is not standardized;

acquire, via the electric device interface, the unstandardized information from the electric device; and send, via the at least one adapter communication interface, to the communication device, the unstandardized information acquired by the adapter processor when the electric device is determined by the adapter processor to hold the unstandardized information, wherein an unstandardized telegraphic message for utilizing an unstandardized function that is a function not standardized is based on unstandardized telegraphic message creation information included in the unstandardized information;

the standardized information includes information that indicates a manufacturer of the electric device; and the adapter processor of the communication adapter is further configured to determine that, in response to the manufacturer indicated by the standardized information being a pre-specified manufacturer, the electric device holds the unstandardized information.

7. A communication method executed by a communication system comprising a communication adapter configured to provide for communication of an electric device and a communication device configured to communicate with the communication adapter, the communication method comprising:

causing the communication adapter to acquire standardized information from the electric device, wherein the standardized information represents information that is standardized;

causing at least either the communication adapter or the communication device to determine whether the electric device holds unstandardized information based on the acquired standardized information, wherein the unstandardized information is not standardized;

causing the communication adapter to acquire the unstandardized information from the electric device; and causing the communication adapter to send the acquired unstandardized information to the communication device when the electric device is determined to hold the unstandardized information, wherein an unstandardized telegraphic message for utilizing an unstandardized function that is a function not standardized is based on unstandardized telegraphic message creation information included in the unstandardized information;

the standardized information includes information that indicates a manufacturer of the electric device;

further comprising determining that, in response to the manufacturer indicated by the standardized information being a pre-specified manufacturer, the electric device holds the unstandardized information.

8. A non-transitory recording medium storing a program for a computer of a communication device configured to communicate with a communication adapter provided for communication of an electric device, the program causing the computer to:

receive a standardized telegraphic message including standardized information from the communication adapter, wherein the standardized telegraphic message represents a telegraphic message that is standardized, the standardized information represents information that is standardized, and the standardized information is acquired from the electric device;

determine whether the electric device holds unstandardized information based on the standardized information included in the standardized telegraphic message received by the communication device, wherein the unstandardized information is not standardized;

send, to the communication adapter, a first unstandardized telegraphic message including a request for the unstandardized information acquired from the electric device when the electric device is determined by the communication device to hold the unstandardized information, wherein the first unstandardized telegraphic message represents a telegraphic message that is not standardized;

receive, from the communication adapter, a second unstandardized telegraphic message including the unstandardized information; and create, based on unstandardized telegraphic message creation information included in the unstandardized information, a third unstandardized telegraphic message for utilizing an unstandardized function that is a function not standardized, wherein the standardized information includes information that indicates a manufacturer of the electric device;

the program further causing the computer to
determine that, in response to the manufacturer indicated by the standardized information being a pre-specified manufacturer, the electric device holds the unstandardized information.

9. A communication system comprising:

a communication adapter adapted to communicate with an electric device, the communication adapter comprises at least one adapter communication interface, an electric device interface, and an adapter-processor cooperatively operable with the electric device interface and the at least one adapter communication interface; and a communication device configured to communicate with the communication adapter, the communication device comprises at least one communication-device communication interface and a communication-device processor cooperatively operable with the at least one communication-device communication interface, wherein the adapter-processor of the communication adapter is configured to acquire, via the electric device interface, standardized information from the electric device, wherein the standardized information represents information that is standardized; and acquire, via the electric device interface, unstandardized information from the electric device, wherein the unstandardized information represents information that is not standardized;

at least one of the adapter-processor of the communication adapter and the communication-device processor of the communication device is further configured to:

determine whether the electric device holds the unstandardized information based on the standardized information acquired by the adapter-processor of the communication adapter; and create, based on unstandardized telegraphic message creation information included in the unstandardized information, an unstandardized telegraphic message for utilizing an unstandardized function that is a function not standardized;

the adapter-processor of the communication adapter is further configured to:

send, to the communication device, unstandardized information acquired by the adapter-processor of the communication adapter when the electric device is determined to hold the unstandardized information, wherein the standardized information includes information that indicates a manufacturer of the electric device; and the at least one of the adapter-processor of the communication adapter and the communication-device processor of the communication device is further configured to determine that, in response to the manufacturer indicated by the standardized information being a pre-specified manufacturer, the electric device holds the unstandardized information.

* * * * *